(12) United States Patent
Mudrick (10) Patent No.: US 8,041,593 B1
(45) Date of Patent: *Oct. 18, 2011

(54) METHOD OF PROVIDING PERSONALIZED SOUVENIRS

(75) Inventor: David Mudrick, Prescott, AZ (US)

(73) Assignee: Orion Photo Industries, Inc., Prescott, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,689

(22) Filed: Apr. 4, 2011

Related U.S. Application Data (63) Continuation of application No. 12/794,146, filed on Jun. 4, 2010, now Pat. No. 7,921,032.

(51) Int. Cl.
*G06Q 10/00* (2006.01)
(52) U.S. Cl. ............... 705/7.12; 705/16; 705/28
(58) Field of Classification Search .......... None
See application file for complete search history.

(56) References Cited

U.S. PATENT DOCUMENTS

| | | | | |
|---|---|---|---|---|
| 2,181,796 A | | 11/1939 | Williams, Jr. | |
| 2,242,296 A | * | 5/1941 | Fraser | 211/51 |
| 2,297,285 A | | 11/1942 | Bledsoe | |
| 2,877,578 A | | 3/1959 | Klitzner | |
| 3,145,924 A | * | 8/1964 | Rosener et al. | 235/60.13 |
| 3,245,315 A | | 4/1966 | Marks et al. | |
| 3,766,854 A | * | 10/1973 | Scarlet | 101/211 |
| 3,788,269 A | * | 1/1974 | Scarlet | 116/173 |
| 4,093,913 A | * | 6/1978 | O'Neal, III | 324/462 |
| 4,510,006 A | * | 4/1985 | Lawson | 156/235 |
| 4,628,418 A | | 12/1986 | Chabria | |
| D293,287 S | | 12/1987 | Cauque et al. | |
| 4,761,618 A | * | 8/1988 | Patron et al. | 331/167 |
| 4,821,291 A | * | 4/1989 | Stevens et al. | 375/259 |
| 4,854,037 A | * | 8/1989 | DeSanto | 29/755 |
| 4,893,903 A | | 1/1990 | Thakar et al. | |
| D307,671 S | | 5/1990 | Satterly | |
| 4,948,232 A | | 8/1990 | Lange | |
| D310,600 S | | 9/1990 | Holterscheidt | |
| D311,158 S | | 10/1990 | Soule | |
| 4,980,679 A | | 12/1990 | Klaubert | |

(Continued)

FOREIGN PATENT DOCUMENTS

CN 2819879 Y 9/2006

(Continued)

OTHER PUBLICATIONS

Becvar, K.. Knowledge as a marketing strategy: Cultural information and ethnic crafts in the retail environment. M.A. dissertation, University of California, San Diego, United States—California.*

(Continued)

*Primary Examiner* — Romain Jeanty
*Assistant Examiner* — Gurkanwaljit Singh
(74) *Attorney, Agent, or Firm* — Santangelo Law Offices, P.C.

(57) ABSTRACT

A method for providing a personalized souvenir is disclosed. The method may include the steps of contacting a souvenir retailer, preparing artwork, selecting names for personalization of the souvenirs, providing a rack to the souvenir retailer for displaying the souvenirs, and servicing the racks to ensure that the rack is maintained with the proper inventory. Additionally, determining an age range of a sales demographic such that the most popular names are selected to include on the souvenir within that age range.

21 Claims, 2 Drawing Sheets

U.S. PATENT DOCUMENTS

| | | | |
|---|---|---|---|
| D319,804 S | | 9/1991 | Johnson et al. |
| 5,113,057 A | * | 5/1992 | Tsai .............................. 219/523 |
| 5,153,760 A | | 10/1992 | Ahmed |
| 5,197,316 A | | 3/1993 | Gottlieb et al. |
| D339,230 S | * | 9/1993 | Thompson .................... D3/209 |
| 5,276,539 A | | 1/1994 | Humphrey |
| D344,183 S | | 2/1994 | Anderson |
| D364,734 S | | 12/1995 | Ben-Zeev et al. |
| 5,628,202 A | * | 5/1997 | Lee et al. ..................... 62/228.5 |
| D381,487 S | | 7/1997 | Sweeney |
| D383,304 S | | 9/1997 | Van Osch |
| 5,704,194 A | * | 1/1998 | Niehaus .......................... 53/415 |
| 5,899,501 A | | 5/1999 | Maxwell |
| 5,988,401 A | * | 11/1999 | Gardner et al. ................. 211/14 |
| D420,938 S | | 2/2000 | Colicher |
| D456,600 S | | 5/2002 | Gadson |
| D458,017 S | | 6/2002 | Yehudai |
| 6,489,921 B1 | * | 12/2002 | Wilkinson ............... 342/357.31 |
| D468,091 S | | 1/2003 | Tipton |
| 6,504,708 B2 | | 1/2003 | Yehudai |
| D475,317 S | | 6/2003 | Fernandez |
| 6,685,338 B1 | | 2/2004 | Lewis et al. |
| 6,713,895 B1 | | 3/2004 | Krapfl |
| 6,780,106 B2 | * | 8/2004 | DeMar et al. ................... 463/16 |
| D495,483 S | | 9/2004 | Vickers et al. |
| D501,715 S | | 2/2005 | Etienne |
| 6,860,045 B1 | | 3/2005 | Sadler et al. |
| 6,943,670 B2 | * | 9/2005 | Liguori et al. ................ 340/321 |
| D525,778 S | | 8/2006 | Jaricot |
| 7,206,757 B2 | | 4/2007 | Seigel et al. |
| D550,952 S | | 9/2007 | Rimon |
| D553,850 S | | 10/2007 | Trower |
| D554,363 S | | 11/2007 | Bates et al. |
| 7,353,571 B2 | | 4/2008 | Goldberg |
| 7,403,942 B1 | * | 7/2008 | Bayliss .......................... 707/748 |
| 2002/0186527 A1 | | 12/2002 | Yehudai |
| 2003/0014305 A1 | | 1/2003 | Harden |
| 2003/0020816 A1 | * | 1/2003 | Hunter et al. .............. 348/231.3 |
| 2003/0022710 A1 | * | 1/2003 | DeMar et al. ................... 463/16 |
| 2003/0050815 A1 | * | 3/2003 | Seigel et al. ........................ 705/7 |
| 2003/0161008 A1 | * | 8/2003 | ZehrGrimm ................ 358/3.29 |
| 2004/0039588 A1 | * | 2/2004 | Libman .............................. 705/1 |
| 2004/0080400 A1 | | 4/2004 | Liguori et al. |
| 2005/0031403 A1 | * | 2/2005 | Pohmajevich et al. ........ 401/131 |
| 2005/0097712 A1 | | 5/2005 | Raynor |
| 2005/0209915 A1 | | 9/2005 | Saluccio |
| 2005/0230596 A1 | * | 10/2005 | Howell et al. ................. 250/200 |
| 2005/0270280 A1 | | 12/2005 | Riback et al. |
| 2006/0030289 A1 | * | 2/2006 | Liguori et al. ................ 455/344 |
| 2006/0138864 A1 | | 6/2006 | Trahanovsky |
| 2006/0208066 A1 | * | 9/2006 | Finn et al. ...................... 235/380 |
| 2006/0225597 A1 | * | 10/2006 | Cohen et al. ................... 101/494 |
| 2006/0269264 A1 | * | 11/2006 | Stafford et al. ................. 396/56 |
| 2006/0270421 A1 | * | 11/2006 | Phillips et al. ................. 455/457 |
| 2006/0282442 A1 | | 12/2006 | Lennon et al. |
| 2007/0019452 A1 | | 1/2007 | Ohkubo et al. |
| 2007/0024734 A1 | | 2/2007 | Headley |
| 2007/0030668 A1 | | 2/2007 | Parsons |
| 2007/0069883 A1 | * | 3/2007 | Collier et al. .................. 340/538 |
| 2007/0150350 A1 | * | 6/2007 | Libman .......................... 705/14 |
| 2008/0077511 A1 | * | 3/2008 | Zimmerman .................. 705/28 |
| 2008/0151134 A1 | * | 6/2008 | Huang ............................. 349/25 |
| 2008/0209701 A1 | | 9/2008 | Goldberg |
| 2010/0070312 A1 | * | 3/2010 | Hunt ................................. 705/5 |

FOREIGN PATENT DOCUMENTS

| | | |
|---|---|---|
| CN | 2908981 Y | 6/2007 |
| CN | 201011889 Y | 1/2008 |
| CN | 201035833 Y | 3/2008 |
| CN | 201153599 Y | 11/2008 |
| CN | 201182267 Y | 1/2009 |
| CN | 201207966 Y | 3/2009 |
| DE | 202006012485 U1 | 7/2006 |
| EP | WO03010710 A1 | 2/2003 |
| EP | 1950724 A1 | 7/2008 |
| JP | 2001324931 A | 11/2001 |
| KR | 10-0449976 B1 | 9/2004 |
| WO | 2005112685 A1 | 12/2005 |
| WO | 2007056902 A1 | 5/2007 |
| WO | 2008106685 A1 | 9/2008 |

OTHER PUBLICATIONS

William E. Winkler, "Advanced Methods for Record Linkage," Bureau of the Census, pp. 1-21.*

William E. Winkler, "The State of Record Linkage and Current Research Problems," U.S. Bureau of the Census, 15 pages.*

William E. Winkler, "Matching and Record Linkage," U.S. Bureau of the Census, pp. 1-38.* http://www.video.aol.com/video-detail/solar-powered-flashing-keyring-its-a-boy-design/764966197.

http://www.twilight.co.za/index.php?option=com_virtuemart &page=shop.browse&category_id=9&Itemid=29.

File Wrapper From U.S. Appl. No. 12/189,584, filed Aug. 11, 2008, entire file wrapper available to USPTO.

File Wrapper From Priority Case U.S. Appl. No. 12/794,146, filed Jun. 4, 2010, entire file wrapper available to USPTO.

File Wrapper From Priority Case U.S. Appl. No. 12/109,899, filed Apr. 25, 2008, entire file wrapper available to USPTO.

File Wrapper From Priority Case U.S. Appl. No. 60/914,115, filed Apr. 26, 2007, entire file wrapper available to USPTO.

Castle Rock LLC Product Sheet; keychain image; believe product introduced after filing Jun. 2009; images reproduced on Aug. 3, 2009; 2 pgs; US.

Castle Rock LLC Product Comparison images; believe product introduced after filing Jun. 2009; images reproduced on Aug. 3, 2009, 2 pgs; US.

Apex Innovations website; Solar Keychain, Solar key chains, keychains; Complete Customized Logo and Products Designs; Solar Logo Blinking Series; Downloaded & printed Aug. 3, 2009; 2 pgs.

Apex Innovations website: Solar Zipper Pulls (Tags)—Unique Gifts, Promotional Products, Creative Novelties; Solar Zipper Pulls (Tags); Downloaded & printed Aug. 4, 2009; 1 pg.

Apex Innovations website; Solar Keychains; Downloaded & printed Aug. 4, 2009; 1 pg.

Kyle Design of California website; Artistic Zipper Pull in 100s of Personalized Designs; Downloaded & printed Aug. 4, 2009; 1 pg.

HiSupplier.com website; China (Mainland) solar key ring exhibition; Solar Key Ring; Downloaded & printed Aug. 4, 2009; 2 pgs.

Ecomark website: Solar Key Chain; Downloaded & printed Aug. 4, 2009; 1 pg.

Google search page: keychain.100-gift.com/catalogs/1086/Solar-LCD; Keychain, Solar LCD Keychain; Downloaded & printed Aug. 4, 2009; 1 pg.

Google search page: www.easybizchina.com/freemember/products/6950; GZ JH Electronic Co., Ltd.; Downloaded & printed Aug. 4, 2009; 1 pg.

Hilltrend USA Ltd. Inc. website; Solar Power LCD Key Chain; HTSP705 New Generation Solar Power blinking LCD Key Chain; Downloaded & printed Aug. 6, 2009; 11 pgs.

Vigorsun Solar Products Ltd. website; Products Show; Solar Flash Key Chain Model No. VS-80073W; Downloaded & printed Aug. 3, 2009; Post date Oct. 14, 1008; Downloaded & printed Aug. 6, 2009; 1 pg.

cornerstone-promo website: solar key chain promotional items imprinted product; Solar key chain No. TJZ-S2028960041; Downloaded & printed Aug. 6, 2009; 2 pgs.

Dona-Ada & Co. website: Solar Key Chain; Downloaded & printed Aug. 3, 2009; 1 pg.

Madeinchina.com website: Apex Innovation technologies Co., Ltd; Solar Key Chain, Flashing Keychain, Blinking Keyring (LCD Light Powered); Downloaded & printed Aug. 3, 2009; 1 pg.

AblazePath.com website: Key Chains; Downloaded & printed Aug. 6, 2009; 1 pg.

CTO International China Trade Online website: Wholesale Flashing Solar Powered LCD Key Chain; Model No. CTO9839; Downloaded & printed Aug. 4, 2009; 2 pgs.

Shenzhen Century Ocean Trading Ltd website: Solar Application; Downloaded & printed Aug. 3, 2009; 1 pg.

DIY Trade website: Large Solar Powered Flashing Keychain with Clock and Compass; Model P079; posted Jan. 17, 2008; Downloaded & printed Aug. 3, 2009;3 pgs.

ECVV.com website: Solar Key Chain List, China Solar Key Chain-Suppliers, Manufacturers; product listing; Downloaded & printed Aug. 3, 2009; 4 pgs.

Riptide Promotions website: Key Tags, Promotional key Chains, Logo Key Chains, Printed Key Chain; Chain Specials; Soft Squeezable Key Tags; Downloaded & printed Aug. 3, 2009;5 pgs.

promopeddler.com website: Custom Imprinted Key-Ring-Lite-Waterproof solar key ring w/light product page; Downloaded & printed Aug. 3, 2009;1 pg.

Oneinhundred.com website:Key Tabs, Wholesale custom Key Tags; Heavy duty black clip-on key reel with split ring; custom promotional Gifts; Downloaded & printed Aug. 3, 2009; 2 pgs.

FFCrafts.com website: Holiday Decorations—Crafts—Trade Offers; Downloaded & printed Aug. 3, 2009; 3 pgs.

Solar Moon.co.uk website: Corporate Solar Promotional Products, Customized Key Chains, Solar Keyrings; Solar Key Chain KC002; Downloaded & printed Aug. 3, 2009; 1 pg.

FF Crafts.com webdsite: Sell Solar Key Chain—China Jewelry & Craft Global B2B E-Marketplace (FFC); Shenzhen Samewin Electronics Co., China; Downloaded & printed Aug. 3, 2009; 2 pgs.

Signorina Donaada Global Consumer Products website: Solar Product; Solar Key Chain; Downloaded & printed Aug. 3, 2009; 2 pgs.

China Solar website: Solar Torch Key Chain No. KS-D33A-C; Downloaded & printed Aug. 3, 2009; 2 pgs.

tradeget.com website: Manufacturer of Innovative Promotional Gift Items; Apex Innovation Technologies Co., Ltd; LCD Solar Power Blinking keychain; keyring; key chain, key holder; Downloaded & printed Aug. 3, 2009; 2 pgs.

Traderscity.com website: 4th generation solar usb memory stick promotional solar flash memory drives oem custom key disk; Company contact: Goldking (HK) Technology, Co., Ltd.; Downloaded & printed Aug. 3, 2009; 3 pgs.

Waysso Electronic Technology Co., Ltd. website; Solar Key Chain WS-SKC01; Downloaded & printed Aug. 3, 2009; 1 pg.

Xinfeng Enterprises Co., Ltd website: Solar energy flashing keychains (TYN008); Downloaded & printed Aug. 3, 2009; 2 pgs.

Raylos Solar website: Ec0-friendly promotional products; Solar key ring light made of AS high transparent resin with carabiner; Item 6320102-128; Downloaded & printed Aug. 3, 2009; 2 pgs.

Google search page www.Made-in-China.com/showroom/cnblz8; Solar Key Chain; Shenzhen Olong Electronic Co. Ltd; Downloaded & printed Aug. 4, 2009; 1 pg.

yicheng.800jit.com website: Mercedes Benz Solar key chain ring C E S R CL SLK Class; Downloaded & printed Aug. 3, 2009; 1 pg.

CTO International website; Promotional Solar Key Chain with Compass; Downloaded & printed Aug. 6, 2009; update time Mar. 24, 2009; Downloaded & printed Aug. 6, 2009; 4 pgs.

www.winbiz.net website: Solar Cool Cap with Mini Fan White Color; Downloaded & printed Aug. 4, 2009; 2 pgs.

sz-wholesale.com website: Solar Energy Key Rings, China Wholesale Center, Products Category, Key Chain, Solar LCD Keychain; Downloaded & printed Aug. 4, 2009; 2 pgs.

made-in-china.com; China Suppliers; Jinggoal International Ltd. website: Solar key Chain Light (JL629); Downloaded & printed Aug. 4, 2009; 3 pgs.

Solarcn.org website: Solar Key Ring, Made in China; Downloaded & printed Aug. 4, 2009; 3 pgs.

biztrademarket.com website: Solar Mobile Chain; Effect Group LTD, China; Downloaded & printed Aug. 4, 2009; 1 pg.

Google search page: www.chinawholesalegift.com/Solar-Products/solar-keychain/; Downloaded & printed Aug. 24, 2009; 9 pg.

IOffer website: www.ioffer.com/search/items/solar%20keychain/text_pics/ioffer/0/false; Downloaded & printed Aug. 24, 2009; 6 pgs.

oursbiz.com website: Solar Key Chain—Cheap Acrylic Keychain from China Key Chain Supplier; Downloaded & printed Aug. 6, 2009; 3 pgs.

Made-in-china website: Solar key ring, China solar key ring; product directory; Downloaded & printed Aug. 6, 2009; 4 pgs.

100-gift website: Keychain Wholesale Center-Manufacturer/Factory/Supplier; Downloaded & printed Aug. 6, 2009; 2 pgs.

saqad website: www.sawadgifts.com; Toyota key ring; Downloaded & printed Aug. 3, 2009; 1 pg.

www.se1121.com website: image of solar-logo-key-chain; Downloaded & printed Aug. 3, 2009; 1 pg.

* cited by examiner

METHOD OF PROVIDING PERSONALIZED SOUVENIRS

This application is a continuation of, and claims benefit of and priority to, U.S. application Ser. No. 12/794,146 filed Jun. 4, 2010, which claims the benefit of and priority to application Ser. No. 12/109,899 filed Apr. 25, 2008, which claims the benefit of and priority to U.S. Provisional Application No. 60/914,115, filed Apr. 26, 2007. The entire specifications and figures of each of the above-mentioned applications are hereby incorporated by reference.

FIELD OF THE INVENTION

Figure 1:
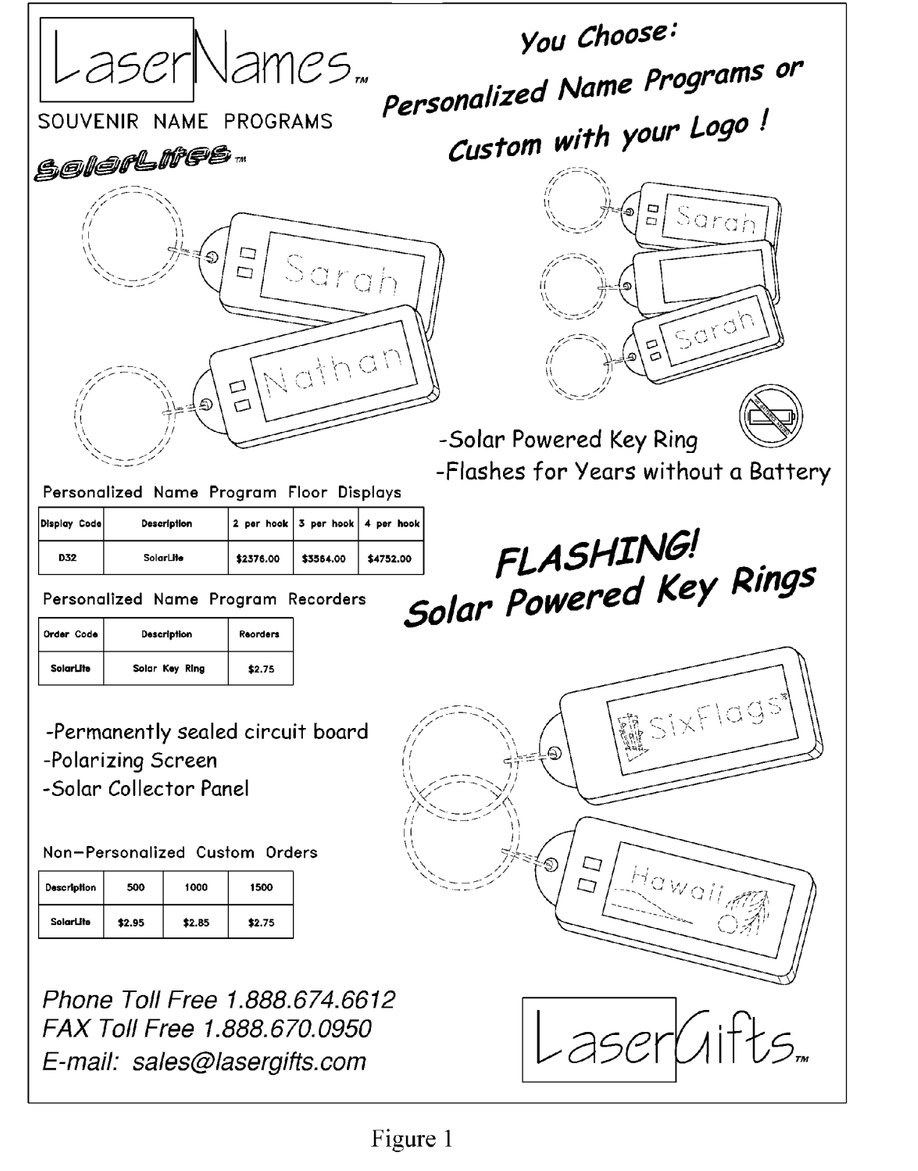
FIG. 1—Is a first representation of various embodiments of a method of and/or apparatus for providing personalized souvenirs.
Figure 2:
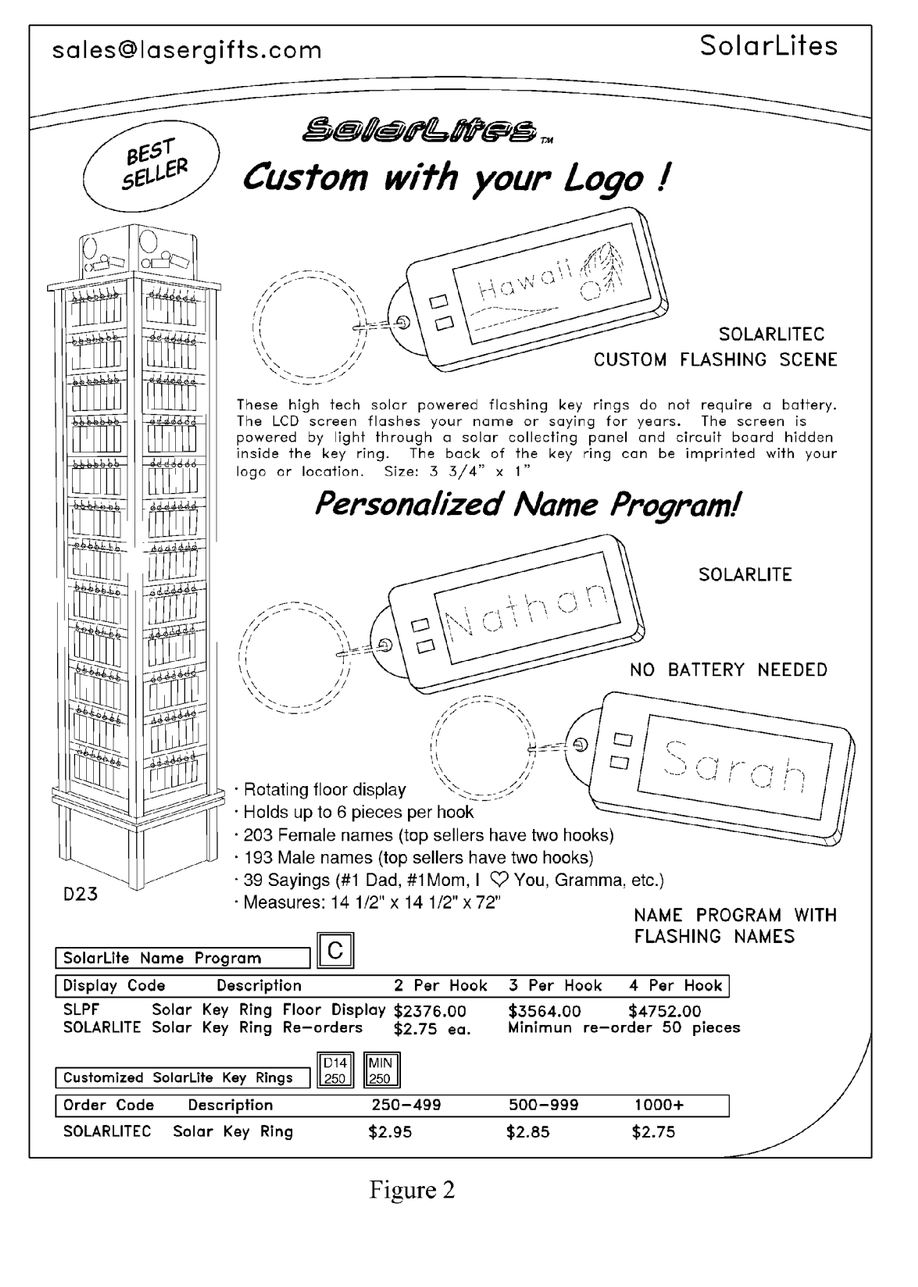
FIG. 2—Is a second representation of various embodiments of a method of and/or apparatus for providing personalized souvenirs.

Primarily referring to FIGS. 1 and 2, the present inventive technology relates generally to a method of supplying souvenirs, and more particularly to a method for providing and servicing a personalized souvenir program.

BACKGROUND OF THE INVENTION

Souvenirs are well known in the prior art. Specifically, when individuals go on vacations or to a special event, there are many opportunities to purchase or otherwise acquire some item that commemorates or reminds them of their experience.

There are many types of souvenirs on the market today. Many of these souvenirs are generic and do not stand out as something special an individual wishes to purchase. Therefore, it is desirous to have a souvenir that is personalized, for example, with the consumer's name and provides a novelty that is appealing to individuals.

Moreover, souvenir retailers want to provide customers a souvenir that is attractive and produces high sales. However, in reality, many souvenir retailers own stores that sell much more than just souvenirs making it difficult for the souvenir retailer to focus the necessary amount of attention on its souvenir program to ensure that it is producing high sales. Thus, it is desirable to purchase a souvenir program from an outside vendor that includes both product and service. The servicing of the souvenir program by an outside vendor ensures that the souvenir program is fully stocked with the proper inventory and is aesthetically pleasing, while at the same time allowing the souvenir retailer to focus on other aspects of its store.

SUMMARY OF THE INVENTION

Primarily referring to FIGS. 1 and 2, the present inventive technology in various embodiments relates generally to a method of providing a souvenir program as in the present invention comprises the steps of contacting a souvenir retailer, providing a souvenir, preparing artwork, selecting names for the personalization of the souvenir, providing a rack to the souvenir retailer for displaying the souvenir, and servicing the rack such that the rack is properly maintained. Additionally, the method of selecting names further comprises the steps of determining an age range of a sales demographic, researching census records and birth records for each year of the range, selecting the top first names from the census records and the birth records; and including the most common names for all ages on the souvenirs. Referring to FIGS. 1 and 2 collectively, embodiments of said method of providing a souvenir further comprises the steps of providing a solar powered souvenir wherein the souvenir further comprises (i) a liquid crystal display screen, (ii) a solar panel, wherein the solar panel converts light into electrical energy, and (iii) an electronic circuit controller that receives said electrical energy and controls the liquid crystal display screen in a programmed manner. Additionally, the liquid crystal display screen is housed in a first side of the solar powered souvenir and the artwork is attached to a second side of the solar powered souvenir.

The present invention is directed to a method of providing a souvenir program to a souvenir retailer.

It is a further object of the present invention to provide a high sales souvenir program.

It is a further object of the present invention to provide a souvenir program with continuous service.

It is a further object of the present invention to provide a souvenir program that offers a personalized souvenir.

It is a further object of the present invention to provide a souvenir that is novel.

The novel features that are considered characteristic of the invention are set forth with particularity in the appended claims. The invention itself, however, both as to its structure and its operation together with the additional object and advantages thereof will best be understood from the following description of the preferred embodiment of the method for providing a personalized souvenir program. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 USC §112, paragraph 6 to define the invention. To the contrary, if the provisions of 35 USC §112, paragraph 6 are sought to be invoked to define the invention(s), the claims will specifically state the phrases "means for" or "step for" and a function, without also reciting in such phrases any structure, material, or act in support of the function.

Moreover, even if the provisions of 35 USC §112, paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later developed equivalent structures, materials, or acts for performing the claimed function.

DESCRIPTION OF PREFERRED EMBODIMENTS

Primarily referring to FIGS. 1 and 2, the present inventive technology in various embodiments generally comprises the steps of selecting names for the personalization of the solar powered souvenir such as through a computer device, contacting a souvenir retailer, preparing artwork, providing a rack, such as is demonstrated in FIG. 2 to the souvenir retailer to display the personalized souvenirs, and servicing the rack to ensure that its inventory is properly maintained perhaps involving a computer.

Preferably, the souvenirs are personalized with individual names such as is demonstrated in FIGS. 1 and 2. The first step to determine the names to include for personalization is to establish the age range of the demographic that will be purchasing the souvenirs. In the preferred embodiment of the invention, the age range is 5 years to 35 years. These are the individuals that are most likely to purchase or receive the personalized souvenirs. Once the age range is established, the census and birth records of the established age range are researched to determine the most popular first names of those years. In addition to the most common names of the age range, the most popular names of all time are also included. The top names are selected and used in the personalization program. In a preferred embodiment, the top 300 names are used. Additionally, it is preferred that the inventory of personalized souvenirs is based upon the popularity of the names where there is a ratio of 15:1 from the most popular name to the least popular name. In other words, there are souvenirs with the most popular name to every one souvenir with the least popular name.

Preferably, a sales representative contacts the souvenir retailers and provides information including pricing, samples of products, services offered, etc. Once the souvenir retailer decides to purchase the personalized souvenir program, the parties enter into a contract establishing the terms of the delivery and service of the souvenirs and the price paid by the souvenir retailer.

Next, the souvenir retailer decides on the type of artwork that will be included on the personalized souvenirs such as a solar powered key ring and/or keychain as detailed in FIG. 1 or 2. It is preferable that the artwork has a connection to the souvenir retailer's geographical location or venue as seen in one embodiment in FIG. 1. However, in an alternate embodiment, the souvenir retailer could be an organization that wishes for its logo to be depicted on the personalized souvenir. In either case, the souvenir retailer can provide the artwork to the sales representative or request that the artwork be designed by the sales representative's employer. Once the artwork is prepared, it is subject to the final approval of the souvenir retailer before the personalized souvenirs are manufactured.

Primarily referring to FIGS. 1 and 2, the artwork may be either non-dynamic, such as a sticker or label, or, the artwork may be dynamic such that the souvenir includes an additional liquid display screen on the second side of the souvenir wherein the additional liquid display screen alternates between transparent and opaque also denoted in FIG. 1 as "Flashing". The artwork may be of any type including the name selected for personalization.

When the artwork has been finalized, the souvenirs are then manufactured. Primarily referring to FIGS. 1 and 2, in a preferred embodiment, the personalized souvenirs are acrylic key chains that include a first side and a second side. The first side houses a liquid crystal display screen (3), a solar panel (1), and an electronic circuit controller (2). The electronic circuit controller (2) can be a circuit board, a triode, or any other appropriate circuit controller. The solar panel (1) converts light into electrical energy which is then transmitted to the electronic circuit controller (2) such that the electronic circuit controller controls the liquid crystal display screen (3) in a programmed manner. More specifically, as seen in FIGS. 1 and 2 it is preferred that the liquid crystal display screen (3) flash between an opaque screen and a translucent screen. When the screen is translucent, the personalized name or other artwork is visible.

The key chain is just one embodiment for the personalized souvenir. Alternate embodiments include zipper pulls, chokers, bracelets, and magnets to name a few. Because the souvenir is solar powered, it does not require a battery. This feature allows the souvenir to flash for an extended period of time. Further, because the souvenir is personalized, it can be used to identify the purchaser's personal items by attaching it to a set of keys, a backpack, a locker, etc.

As seen in FIGS. 1 and 2, in one embodiment of the invention, the personalized name label is affixed to the back of the liquid crystal display screen. The liquid crystal display screen is placed on top of the plastic piece with the personalized name. As stated above, when the liquid crystal display screen is opaque, the name is not visible, and when the liquid crystal display screen is translucent, the name is visible. The liquid crystal display screen flashes in a programmed manner. This means that the entire screen flashes or that the screen is partitioned and different parts flash at different times.

As seen in FIG. 1, in another embodiment a second side of for example a key chain displays the artwork selected by the souvenir retailer. It is preferred that the artwork is also on an adhesive backed piece of paper. The paper with the artwork is adhered to the second side of the key chain. As such, the artwork and the personalized name each face different directions. Referencing FIG. 2, when placed for example on the rack provided to the souvenir retailer, it is important that the name side of the souvenir face the potential purchaser. Because the souvenir is personalized, the purchaser is searching for his or her own name. Therefore, in certain preferred embodiments of the invention, the key chain does not have a swivel point that allows the key chain to move to the artwork side while hanging on the rack. When the sales representative comes to the souvenir retailer's place of business to provide service to the rack, it is that person's responsibility to ensure that the key chains on the rack are all oriented such that the names face outward.

As mentioned above, the sales representative provides an ongoing service to the souvenir retailer to maintain the souvenir retailer's inventory and aesthetic look of the display rack as shown in one embodiment in FIG. 2. This service can be provided anywhere from two (2) to three (3) times a week to once a month. Due to the nature of the souvenir industry, there are some retailers that run a seasonal business (i.e., amusement parks, ski resorts, beaches, etc.). These types of retailers will not require service of their souvenir program throughout the year, but may require nearly continuous service throughout their busiest season. In this type of situation, the sales representative may require additional help in providing the necessary service. This additional help can be acquired through hiring an outside contract service company that aids in maintaining the souvenir retailer's souvenir program throughout its busiest season. It is preferred to provide this high level of service to the souvenir retailer so that the souvenir program produces high sales for the souvenir retailer and in turn the sales representative's employer. In some instances, however, the servicing of the program may be performed by the customer. This may be due to special circumstances such as remote locations or point of sale systems that can track sales by name.

In an alternate embodiment of the invention, the inventory is electronically monitored such as with a computer device. In one embodiment, each key ring has a universal product code that corresponds to the particular name on the souvenir. Every time a souvenir is purchased, the information is captured electronically such as with a computer device allowing an individual to know which names to re-stock. In a further alternate embodiment of the invention, the souvenirs and/or the souvenir rack includes a radio frequency identification ("RFID") system. The RFID system aids in the supply chain management of the souvenir inventory. Specifically, this type of service can reduce the number of times a service representative actually makes a visit to a site, which ultimately increases the profit of the souvenir retailer. The information received and stored by the RFID system is transmitted to the souvenir supplier in real time such as with a computer device and provides an up to date inventory of the products on the rack. This information is extremely valuable, especially during the retailer's busiest selling times. It ensures that the souvenir sales representative possesses the most current inventory count either before or at the time of visiting the retailer's store such that the representative can bring the required inventory with him or her to each visit. This improves the efficiency of the inventory supply management by reducing the number of trips the sales representative has to make to the retailer's store to properly maintain the personalized souvenir rack.

More specifically, the alternate embodiment of the invention could include a kit for a personalized solar powered souvenir program that comprises a solar powered souvenir having a selected name wherein the solar powered souvenir comprises 1) a liquid crystal display screen for displaying the selected name; 2) a solar panel, wherein the solar panel converts light into electrical energy; 3) an electronic circuit controller, wherein the electronic circuit controller receives the electrical energy and controls the liquid crystal display screen in a programmed manner; 4) housing said liquid crystal display screen in a first side of the solar powered souvenir with the name wherein the liquid crystal display screen alternates between transparent and opaque such that the name is dynamically displayed; 5) including artwork on a second side of the solar powered souvenir; and 6) an inventory monitoring device. In addition, the kit for the personalized solar powered souvenir program can include a rack to display an inventory of the solar powered souvenirs and a computer device.

It is preferred in an alternate embodiment that the inventory monitoring device of the kit for the personalized solar powered souvenir program is electronic such as involving a computer device. Moreover, the electronic inventory monitoring device is preferably a radio frequency identification system where the radio frequency identification system transmits the inventory information to a receiver that is located on the rack. An individual then preferably monitors the receiver on the said rack in order to maintain the inventory. Alternatively, the electronic inventory monitoring device is preferably a radio frequency identification system where the radio frequency identification system transmits the inventory information to a receiver that is located at either a portable or fixed location within transmitting distance. An individual then preferably monitors the receiver in order to maintain the inventory.

In a further alternate embodiment, the inventory monitoring device is a universal product code that is coupled to the personalized solar powered souvenir. In this embodiment, a unique universal product code corresponds to each personalized name such that the inventory is computer monitored upon a souvenir being purchased. The use of a radio frequency identification system and Universal Product Code as the inventory monitoring device are just two embodiments. In fact, the inventory monitoring device could be a computer device or any type of device or system that efficiently tracks and manages the souvenir inventory.

The preferred embodiment of the invention is described in the Description of Preferred Embodiments. While these descriptions directly describe the one embodiment, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method of providing a plurality of souvenir devices through a light transforming composite presentation comprising the steps of:
    establishing a plurality of personalized solar powered programmed souvenir devices;
    selecting at least one artwork for each of said personalized solar powered programmed souvenir devices;
    having each of said personalized solar powered programmed souvenir devices manufactured to electronically transform and dynamically display at least one of said selected artwork through operation of an electronic circuit that causes the transformation of said display;
    presenting said plurality of personalized solar powered devices in a manner that said personalized solar powered devices present a light transforming composite appearance that electronically transforms and dynamically displays a plurality of said selected artwork;
    configuring said plurality of personalized solar powered programmed souvenir devices to each accomplish the steps of:
        displaying a selected artwork through said display screen; and
        utilizing a solar panel, wherein said solar panel converts light into electrical energy; and
    electronically controlling an electronic circuit, wherein said electronic circuit receives said electrical energy and controls said display screen to transform;
    configuring said liquid crystal display screen controlled by an electronic circuit such that said artwork is dynamically displayed through operation of said electronic circuit;
    maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays; and
    maintaining said light transforming composite appearance with use of a re-order system wherein each said personalized solar powered programmed souvenir device is frequently replenished so as to create a light transforming composite display when exposed to light with use of said electronic circuit wherein each said personalized solar powered programmed souvenir device is frequently replenished so as to create a light transforming composite display when exposed to light.

2. A method of providing a plurality of souvenir devices through a light transforming composite presentation as described in claim 1 wherein said step of establishing a plurality of personalized solar powered programmed souvenir devices comprises the step of establishing a plurality of personalized solar powered programmed souvenir devices selected from the group consisting of:
- establishing a plurality of personalized solar powered programmed keychain souvenir devices,
- establishing a plurality of personalized solar powered programmed zipper pull souvenir devices,
- establishing a plurality of personalized solar powered programmed choker souvenir devices,
- establishing a plurality of personalized solar powered programmed bracelet souvenir devices,
- establishing a plurality of personalized solar powered programmed keyring souvenir devices, and
- establishing a plurality of personalized solar powered programmed magnet souvenir devices.

3. A method of providing a plurality of souvenir devices through a light transforming composite presentation as described in claim 1 wherein said step of selecting at least one artwork for each of said personalized solar powered programmed souvenir devices comprises the step of selecting at least one artwork for each of said personalized solar powered programmed souvenir devices with use of a computer device.

4. A method of providing a plurality of souvenir devices through a light transforming composite presentation as described in claim 1 wherein said step of maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays comprises the step of utilizing at least one electronic inventory management system.

5. A method of providing a plurality of souvenir devices through a light transforming composite presentation as described in claim 4 wherein said step of utilizing at least one electronic inventory management system comprises the step of utilizing at least one electronic inventory management system selected from the group consisting of: utilizing at least one radio frequency identification system (RFID); utilizing at least one universal product code (UPC); utilizing at least one retailer's point of sale system; and utilizing at least one real-time transmitter capable of transmitting a signal to a receiver.

6. A method of providing a plurality of souvenir devices through a light transforming composite presentation as described in claim 3 wherein said step of selecting at least one artwork for each of said personalized solar powered programmed souvenir devices with use of a computer device comprises the step of selecting at least one artwork for each of said personalized solar powered programmed souvenir devices with use of a computer device selected from the group consisting of: determining an age range of a sales demographic; and selecting top first names.

7. A method of providing a plurality of souvenir devices through a light transforming composite presentation as described in claim 6 wherein said step of selecting top first names further comprises the steps of:
- researching census records and/or birth records with a computer device; and
- selecting top first names from said census records and said birth records with a computer device.

8. A method of providing a plurality of souvenir devices through a light transforming composite presentation as described in claim 1 wherein said step of selecting at least one artwork for each of said personalized solar powered programmed souvenir devices comprises the step of selecting at least one artwork for each of said personalized solar powered programmed souvenir devices selected from the group consisting of:
- selecting at least one gender personalized artwork for each of said personalized solar powered programmed souvenir devices,
- selecting at least one generic saying for each of said personalized solar powered programmed souvenir devices,
- selecting at least one personalized dynamic artwork for each of said personalized solar powered programmed souvenir devices,
- selecting at least one non-dynamic artwork for each of said personalized solar powered programmed souvenir devices,
- selecting at least one personalized non-dynamic artwork for each of said personalized solar powered programmed souvenir devices,
- selecting at least one geographic indicator for each of said personalized solar powered programmed souvenir devices, and
- selecting at least one commercial identifier for each of said personalized solar powered programmed souvenir devices.

9. A method of providing a plurality of souvenir devices through a light transforming composite presentation as described in claim 1 wherein said step of configuring said liquid crystal display screen controlled by an electronic circuit such that said artwork is dynamically displayed through operation of said electronic circuit comprises the step of configuring said liquid crystal display screen such that it alternates between transparent and opaque such that said artwork is dynamically displayed.

10. A method of providing a plurality of souvenir devices through a light transforming composite presentation as described in claim 1 wherein said step of maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays comprises the step of maintaining said light transforming composite appearance with use of a personalized re-order system wherein each said personalized solar powered programmed souvenir device is frequently replenished so as to create a light transforming composite display when exposed to light.

11. A method of providing a plurality of souvenir devices through a light transforming composite presentation as described in claim 1 wherein said step of maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays comprises the step of maintaining said light transforming composite appearance with use of a customized re-order system wherein each said personalized solar powered programmed souvenir device is frequently replenished so as to create a light transforming composite display when exposed to light.

12. A method of providing a plurality of souvenir devices through a light transforming composite presentation comprising the steps of:
- establishing a plurality of personalized solar powered programmed souvenir devices;
- selecting at least one artwork for each of said personalized solar powered programmed souvenir devices;
- presenting said plurality of personalized solar powered devices in a manner that said personalized solar powered devices present a light transforming composite appearance that electronically transforms and dynamically displays a plurality of said selected artwork;
- configuring said plurality of personalized solar powered programmed souvenir devices to each accomplish the steps of:
  - displaying a selected artwork through said display screen; and
  - utilizing a solar panel, wherein said solar panel converts light into electrical energy; and
- electronically controlling an electronic circuit, wherein said electronic circuit receives said electrical energy and controls said display screen to transform;
- configuring said liquid crystal display screen controlled by an electronic circuit such that said artwork is dynamically displayed through operation of said electronic circuit;
- maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays.

13. A method of providing a plurality of souvenir devices through a light transforming composite presentation as described in claim 12 wherein said step of establishing a plurality of personalized solar powered programmed souvenir devices comprises the step of establishing a plurality of personalized solar powered programmed souvenir devices selected from the group consisting of:
- establishing a plurality of personalized solar powered programmed keychain souvenir devices,
- establishing a plurality of personalized solar powered programmed zipper pull souvenir devices,
- establishing a plurality of personalized solar powered programmed choker souvenir devices,
- establishing a plurality of personalized solar powered programmed bracelet souvenir devices,
- establishing a plurality of personalized solar powered programmed keyring souvenir devices, and
- establishing a plurality of personalized solar powered programmed magnet souvenir devices.

14. A method of providing a plurality of souvenir devices through a light transforming composite presentation as described in claim 12 wherein said step of selecting at least one artwork for each of said personalized solar powered programmed souvenir devices comprises the step of selecting at least one artwork for each of said personalized solar powered programmed souvenir devices with use of a computer device.

15. A method of providing a plurality of souvenir devices through a light transforming composite presentation as described in claim 12 wherein said step of maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays comprises the step of utilizing at least one electronic inventory management system.

16. A method of providing a plurality of souvenir devices through a light transforming composite presentation as described in claim 15 wherein said step of utilizing at least one electronic inventory management system comprises the step of utilizing at least one electronic inventory management system selected from the group consisting of: utilizing at least one radio frequency identification system (RFID); utilizing at least one universal product code (UPC); utilizing at least one retailer's point of sale system; and utilizing at least one real-time transmitter capable of transmitting a signal to a receiver.

17. A method of providing a plurality of souvenir devices through a light transforming composite presentation as described in claim 14 wherein said step of selecting at least one artwork for each of said personalized solar powered programmed souvenir devices with use of a computer device comprises the step selected from the group consisting of: determining an age range of a sales demographic, researching census records and/or birth records with a computer device, selecting top first names from said census records and said birth records with a computer device.

18. A method of providing a plurality of souvenir devices through a light transforming composite presentation as described in claim 12 wherein said step of selecting at least one artwork for each of said personalized solar powered programmed souvenir devices comprises the step of selecting at least one artwork for each of said personalized solar powered programmed souvenir devices selected from the group consisting of:
- selecting at least one gender personalized artwork for each of said personalized solar powered programmed souvenir devices;
- selecting at least one generic saying for each of said personalized solar powered programmed souvenir devices;
- selecting at least one personalized dynamic artwork for each of said personalized solar powered programmed souvenir devices;
- selecting at least one non-dynamic artwork for each of said personalized solar powered programmed souvenir devices;
- selecting at least one personalized non-dynamic artwork for each of said personalized solar powered programmed souvenir devices;
- selecting at least one geographic indicator for each of said personalized solar powered programmed souvenir devices; and
- selecting at least one commercial identifier for each of said personalized solar powered programmed souvenir devices.

19. A method of providing a plurality of souvenir devices through a light transforming composite presentation as described in claim 12 wherein said step of configuring said liquid crystal display screen controlled by an electronic circuit such that said artwork is dynamically displayed through operation of said electronic circuit comprises the step of configuring said liquid crystal display screen such that it alternates between transparent and opaque such that said artwork is dynamically displayed.

20. A method of providing a plurality of souvenir devices through a light transforming composite presentation as described in claim 12 wherein said step of maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays comprises the step of maintaining said light transforming composite appearance with use of a personalized re-order system wherein each said personalized solar powered programmed souvenir device is frequently replenished so as to create a light transforming composite display when exposed to light.

21. A method of providing a plurality of souvenir devices through a light transforming composite presentation as described in claim 12 wherein said step of maintaining said light transforming composite appearance with use of a re-order system wherein each said personalized solar powered programmed souvenir device is frequently replenished so as to create a light transforming composite display when exposed to light through operation of electronic circuitry that control said liquid crystal displays and cause transformation of said displays comprises the step of maintaining said light transforming composite appearance with use of a customized re-order system wherein each said personalized solar powered programmed souvenir device is frequently replenished so as to create a light transforming composite display when exposed to light.

* * * * *